(12) United States Patent
Quan et al.

(10) Patent No.: US 9,125,181 B2
(45) Date of Patent: Sep. 1, 2015

(54) SYSTEMS AND METHODS FOR COMPRESSING HEADERS

(75) Inventors: Zhi Quan, San Diego, CA (US); Simone Merlin, San Diego, CA (US); Santosh Paul Abraham, San Diego, CA (US); Hemanth Sampath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 282 days.

(21) Appl. No.: 13/589,675

(22) Filed: Aug. 20, 2012

(65) Prior Publication Data

US 2013/0215836 A1    Aug. 22, 2013

Related U.S. Application Data

(60) Provisional application No. 61/514,365, filed on Aug. 23, 2011, provisional application No. 61/546,537, filed on Oct. 12, 2011, provisional application No. 61/546,859, filed on Oct. 13, 2011.

(51) Int. Cl.
*H04W 76/02* (2009.01)
*H04W 28/06* (2009.01)
*H04L 29/06* (2006.01)

(52) U.S. Cl.
CPC ............ *H04W 76/021* (2013.01); *H04L 69/04* (2013.01); *H04L 69/22* (2013.01); *H04W 28/06* (2013.01)

(58) Field of Classification Search
USPC .................................. 370/329, 477; 709/247
See application file for complete search history.

(56) References Cited

U.S. PATENT DOCUMENTS

| | | | |
|---|---|---|---|
| 6,604,149 | B1 | 8/2003 | Deo et al. |
| 7,170,893 | B2 | 1/2007 | Rajan et al. |
| 7,551,644 | B1 | 6/2009 | Mohaban et al. |
| 7,899,056 | B2 | 3/2011 | Chen et al. |
| 8,842,657 | B2 | 9/2014 | Walton et al. |

(Continued)

FOREIGN PATENT DOCUMENTS

| | | |
|---|---|---|
| CA | 2316533 A1 | 2/2002 |
| JP | 2004343567 A | 12/2004 |

(Continued)

OTHER PUBLICATIONS

Bormann et al., RFC3095, "RObust Header Compression (ROHC): Framework and four profiles: RTP, UDP, ESP, and uncompressed", Jul. 2001, pp. 116, 130, 143, and 165, downloaded from tools.ietf.org/pdf/rfc3095.pdf.*

(Continued)

*Primary Examiner* — Hanh N Nguyen
*Assistant Examiner* — Jose Perez
(74) *Attorney, Agent, or Firm* — S. Hossain Beladi

(57) ABSTRACT

A method includes assigning a flow identifier to a flow that includes a plurality of packets. The method also includes generating a head packet of the plurality of packets. The head packet includes one or more header information fields that are associated with the flow identifier. The method further includes generating at least one data packet of the plurality of packets. The at least one data packet includes packet specific information and the flow identifier instead of the one or more header information fields. The method further includes transmitting the head packet. The method further includes, in response to detecting a successful receipt of the head packet, transmitting the at least one data packet.

55 Claims, 7 Drawing Sheets

(56) References Cited

U.S. PATENT DOCUMENTS

| | | | |
|---|---|---|---|
| 2004/0033801 A1* | 2/2004 | Yi et al. | 455/428 |
| 2004/0258092 A1 | 12/2004 | Sugaya | |
| 2006/0248429 A1 | 11/2006 | Grandhi et al. | |
| 2007/0002850 A1* | 1/2007 | Guichard et al. | 370/389 |
| 2007/0058679 A1* | 3/2007 | Pelletier et al. | 370/477 |
| 2007/0110055 A1* | 5/2007 | Fischer et al. | 370/389 |
| 2008/0025312 A1 | 1/2008 | Kuppuswamy et al. | |
| 2008/0130538 A1* | 6/2008 | Raissinia et al. | 370/310 |
| 2008/0219176 A1 | 9/2008 | Yamada | |
| 2008/0273700 A1* | 11/2008 | Wentink | 380/270 |
| 2009/0003347 A1* | 1/2009 | Yang et al. | 370/392 |
| 2009/0059958 A1* | 3/2009 | Nakata | 370/474 |
| 2009/0122755 A1* | 5/2009 | Seok et al. | 370/329 |
| 2009/0141723 A1* | 6/2009 | Giesberts et al. | 370/392 |
| 2010/0046550 A1* | 2/2010 | Mammarappallil et al. | 370/474 |
| 2010/0046553 A1* | 2/2010 | Daigle et al. | 370/474 |
| 2010/0172375 A1* | 7/2010 | Rochon et al. | 370/474 |
| 2010/0208655 A1* | 8/2010 | Kim et al. | 370/328 |
| 2011/0149822 A1* | 6/2011 | Sammour et al. | 370/311 |
| 2011/0149848 A1 | 6/2011 | Ho et al. | |
| 2013/0230038 A1 | 9/2013 | Walton et al. | |

FOREIGN PATENT DOCUMENTS

| | | |
|---|---|---|
| JP | 2007174536 A | 7/2007 |
| JP | 2010503328 A | 1/2010 |
| JP | 2011139515 A | 7/2011 |
| JP | 2012501103 A | 1/2012 |
| JP | 2012514369 A | 6/2012 |
| KR | 20110093656 A | 8/2011 |
| WO | WO-2005039133 A1 | 4/2005 |
| WO | 2008030679 A2 | 3/2008 |
| WO | WO-2010022270 A2 | 2/2010 |
| WO | WO-2010076700 A1 | 7/2010 |
| WO | WO 2010100014 A1 * | 9/2010 |

OTHER PUBLICATIONS

U.S. Appl. No. 13/474,564, filed May 17, 2012.
U.S. Appl. No. 13/474,573, filed May 17, 2012.
International Search Report and Written Opinion—PCT/US2012/051896—ISA/EPO—Feb. 21, 2013.

* cited by examiner

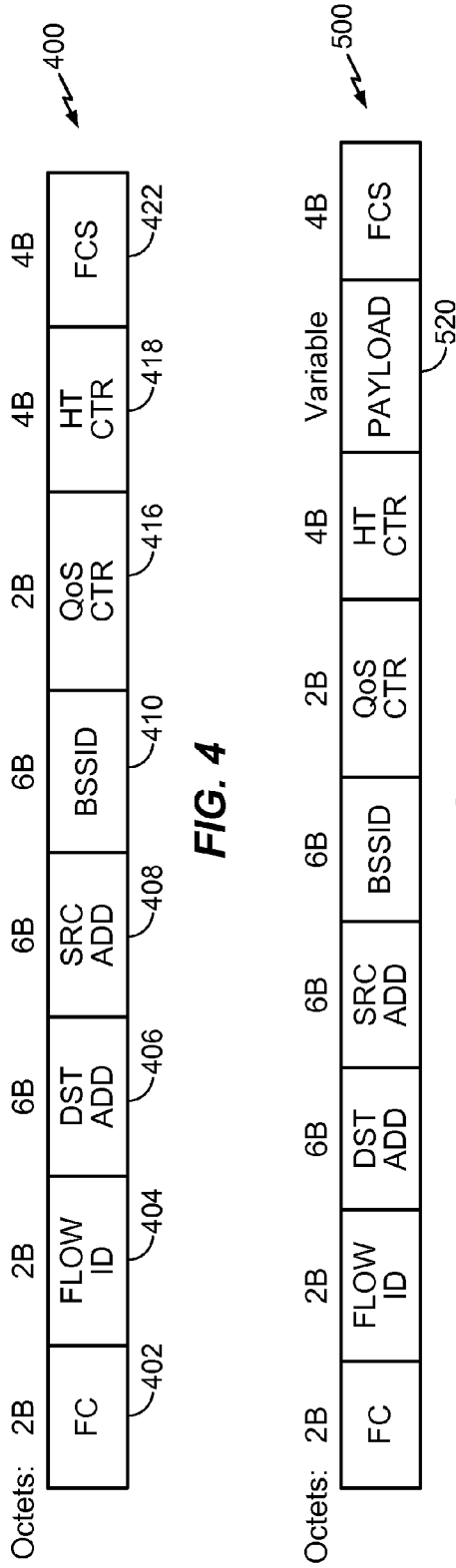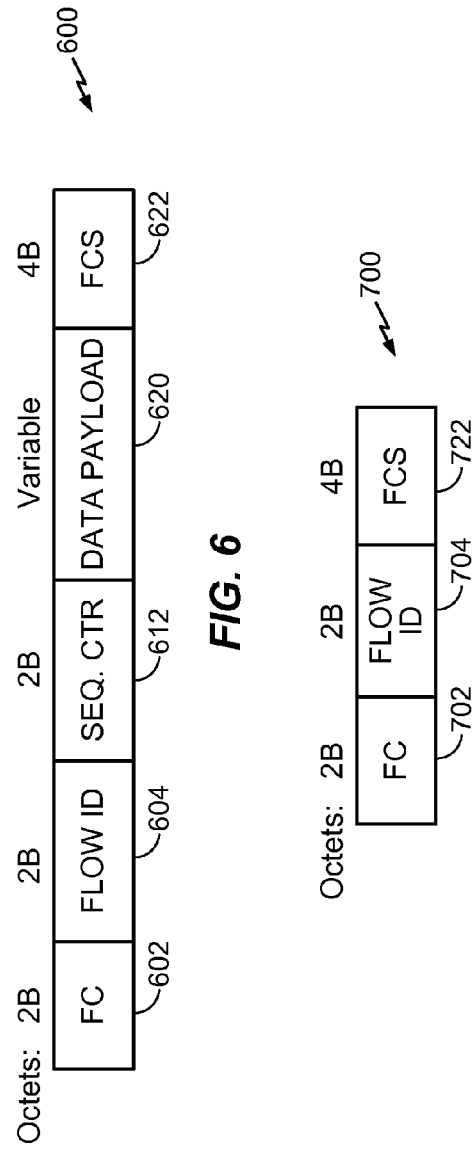

SYSTEMS AND METHODS FOR COMPRESSING HEADERS

CROSS REFERENCE TO RELATED APPLICATIONS

The present application claims the benefit of and priority from U.S. Provisional Application No. 61/514,365 filed Aug. 23, 2011, U.S. Provisional Application No. 61/546,537 filed Oct. 12, 2011, and U.S. Provisional Application No. 61/546,859 filed Oct. 13, 2011, the contents of which are expressly incorporated herein by reference in their entirety.

FIELD OF THE DISCLOSURE

The present application relates generally to wireless communications and more specifically to systems, methods, and devices for reducing the information sent in headers of packets of a flow.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, e, infra-red, optical, etc. frequency bands. Wireless networks advantageously facilitate user mobility and rapid field deployment when compared to fixed wired networks.

The devices in a wireless network may transmit/receive information between each other. The information may take the form of a series of packets transmitted from a source device (the transmitting device) to a destination device (the received device). The series of packets may be known as a "flow." Improved systems, methods, and devices for transmitting and receiving flows are desired.

SUMMARY

The systems, methods, and devices of the disclosure each have several aspects, no single one of which is solely responsible for its desirable attributes. Without limiting the scope of this invention as expressed by the claims which follow, some features will now be described briefly. After considering this discussion, and particularly after reading the section entitled "Detailed Description" one will understand how the features of this invention provide advantages that include improved transmission of flows in a wireless network.

In a particular embodiment, a wireless communications device includes a processor configured to assign a flow identifier to a flow that includes a plurality of packets. The processor is also configured to generate a head packet of the plurality of packets. The head packet includes one or more header information fields that are associated with the flow identifier. The processor is further configured to generate at least one data packet of the plurality of packets. The at least one data packet includes packet specific information and the flow identifier instead of the one or more header information fields. The wireless communications device also includes a transmitter configured to transmit the head packet and, in response to detecting a successful receipt of the head packet, transmit the at least one data packet.

In another particular embodiment, a method includes assigning a flow identifier to a flow that includes a plurality of packets. The method also includes generating a head packet of the plurality of packets. The head packet includes one or more header information fields that are associated with the flow identifier. The method further includes generating at least one data packet of the plurality of packets. The at least one data packet includes packet specific information and the flow identifier instead of the one or more header information fields. The method further includes transmitting the head packet. The method further includes, in response to detecting a successful receipt of the head packet, transmitting the at least one data packet.

In another particular embodiment, a wireless communications device includes a receiver configured to receive a flow that includes a plurality of packets having a head packet and at least one data packet. The head packet includes a flow identifier of the flow and one or more header information fields associated with the flow identifier. The at least one data packet includes packet specific information and the flow identifier instead of the one or more header information fields. The wireless communications device also includes a processor configured to process the at least one data packet based on the one or more header information fields.

In another particular embodiment, a method includes receiving a flow that includes a plurality of packets having a head packet and at least one data packet. The head packet includes a flow identifier of the flow and one or more header information fields associated with the flow identifier. The at least one data packet includes packet specific information and the flow identifier instead of the one or more header information fields. The method also includes processing the at least one data packet based on the one or more header information fields.

In another particular embodiment, a method includes generating a packet that includes an acknowledgement type indicator, where the acknowledgement type indicator is included in a physical layer preamble of the packet or in a frame control field of the packet, and wherein the acknowledgement type indicator includes an indication that the packet is to be acknowledged by a frame acknowledgement, an indication that the packet is to be acknowledged by a block acknowledgement, or an indication that the packet is not be acknowledged. The method also includes transmitting the packet.

BRIEF DESCRIPTION OF THE DRAWINGS

FIG. 4 illustrates an example of a head frame transmitted as part of a flow between wireless devices of the wireless communication system of FIG. 1;

FIG. 5 illustrates another example of a head frame transmitted as part of a flow between wireless devices of the wireless communication system of FIG. 1;

FIG. 6 illustrates an example of a data frame transmitted as part of a flow between wireless devices of the wireless communication system of FIG. 1;

FIG. 7 illustrates an example of a tail frame transmitted as part of a flow between wireless devices of the wireless communication system of FIG. 1;

DETAILED DESCRIPTION

Figure 1:
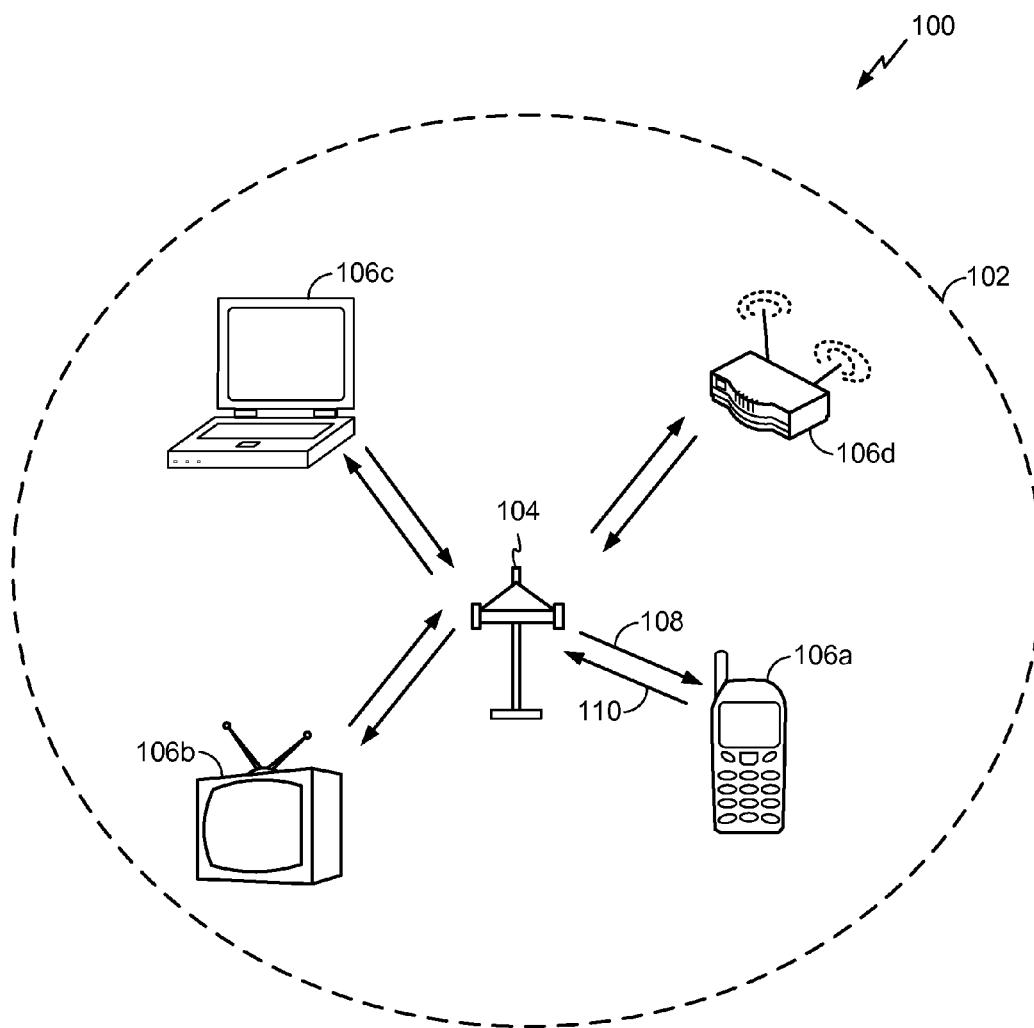
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the disclosure set forth herein. It should be understood that any aspect disclosed herein may be identified by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description. The detailed description and drawings are merely illustrative of the disclosure rather than limiting.

Popular wireless network technologies may include various types of wireless local area networks (WLANs). A WLAN may be used to interconnect nearby devices together, employing networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

Popular wireless network technologies may include various types of wireless local area networks (WLANs). A WLAN may be used to interconnect nearby devices together, employing networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM). Implementations of the 802.11ah protocol may be used for sensors, metering, and smart grid networks. Advantageously, aspects of certain devices implementing the 802.11ah protocol may experience increased battery life with respect to other wireless protocols and may be used to transmit wireless signals across a relatively long range, for example about one kilometer or longer.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem.

As described above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
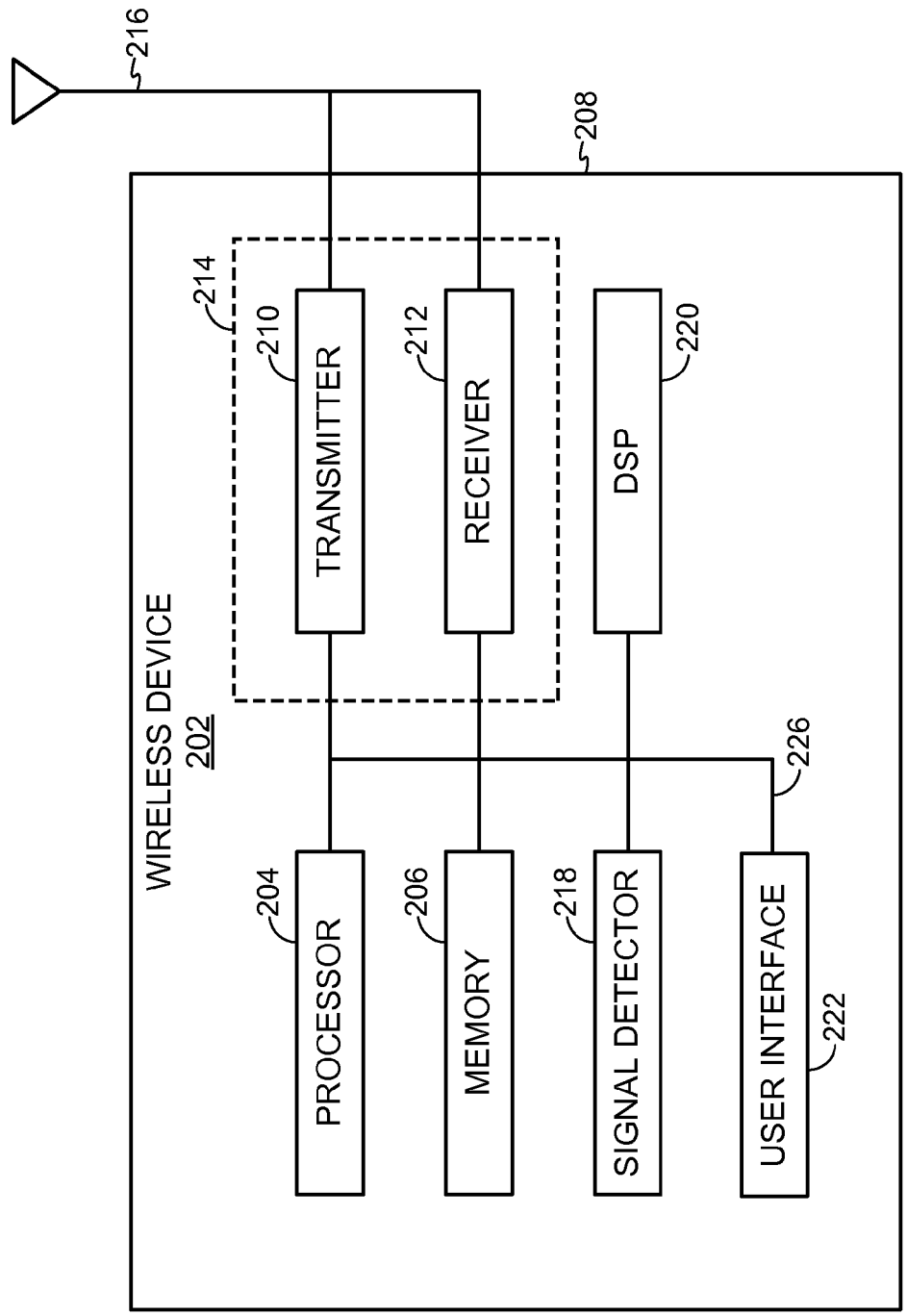
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets, which may include header information as described below. For example, the transmitter 210 may be configured to transmit packets generated by the processor 204.

The receiver 212 may be configured to wirelessly receive packets.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As described above, the wireless device 202 may comprise an AP 104 or an STA 106 and may be used to transmit and/or receive data.

Described herein are systems, methods, and devices for reducing the amount of header information transmitted from a source device, such as the wireless device 202t, to a destination device, such as the wireless device 202r. Certain aspects are described herein with respect to media access control (MAC) headers. However, the aspects described are not limited to MAC headers and can equally be applied to other appropriate types of headers and packets.

As referred to herein, a "flow" can be a series or sequence of packets transmitted from a source device to a destination device that the source devices labels as a flow. A flow may be associated with transmission of particular data from the source device to a destination device, for example, a particular file such as a video file. The packets of a flow, therefore, may share some relationship (at a minimum they are each transmitted from and received at the same devices). In an embodiment, a flow can include a sequence of multiple MAC Protocol Data Units (MPDUs) with common MAC header fields such as, for example, source address, destination address, Basic Service Set Identifier (BSSID), Quality of Service (QoS)/HT control, etc. In various embodiments, the destination device uses certain information about the packets to properly decode the packets of a flow. In certain aspects, the information used to decode a packet is sent in a header portion of the packet. The packets, therefore, may include header information and/or the data to be transmitted from the source device to the destination device.

Figure 3:
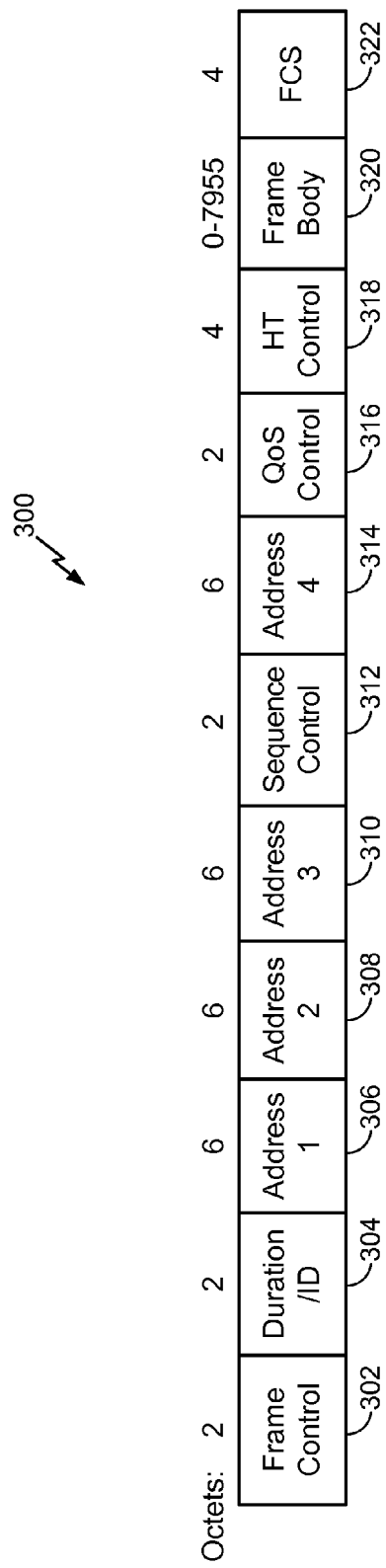
FIG. 3 illustrates an example of a packet transmitted as part of a flow between wireless devices of the wireless communication system of FIG. 1.

FIG. 3 illustrates an example of a packet 300 transmitted as part of a flow between wireless devices 202t and 202r. As shown, the packet 300 comprises a MAC frame that has a MAC frame format. The packet 300 includes a frame control (FC) field 302 that is 2 octets (e.g., bytes) in length. The FC field 302 may indicate the type (in this case a MAC frame) of the packet 300. The FC field 302 is followed by a duration or identifier (ID) field 304 that is 2 octets in length. The duration/ID field 304 may indicate the length of the packet 300 or an identifier of the packet 300. The duration/ID field 304 is followed by an address 1 field 306 that is 6 octets in length.

Referring still to FIG. 3, the address 1 field 306 may indicate the address of the destination device (e.g., wireless device 202r) of the packet 300. The address 1 field 306 is followed by an address 2 field 308 that is 6 octets in length. The address 2 field 308 may indicate the address of the source device (e.g., wireless device 202t) of the packet 300. The address 2 field 308 is followed by an address 3 field 310 that is 6 octets in length. The address 3 field 310 may be used by the destination device (e.g., wireless device 202t) of the packet 300 for filtering. The address 3 field 310 is followed by a sequence control field 312 that is 2 octets in length.

The sequence control field 312 may indicate the order or sequence number of the packet 300 within a flow. The sequence control field 312 is followed by an optional address 4 field 314 that is 6 octets in length. The address 4 field may further be used by the destination device (e.g., wireless device 202t) of the packet 300 for filtering. The address 4 field 314 is followed by a quality of service (QoS) control field 316 that is 2 octets in length. The QoS control field 316 may be used to indicate a QoS level or parameter of the packet 300. The QoS control field 316 is followed by a high throughput (HT) control field 318 that is 4 octets in length. The HT control field 318 may be used to indicate a mode in which the packet 300 is transmitted (e.g., normal or high throughput).

The HT control field 318 is followed by the frame body 320 that includes the data to be transmitted from the wireless device 202t to the wireless device 202r. Depending on the data sent, the frame body 320 is 0-7955 octets. The frame body 322 is followed by a frame check sequence (FCS) field 322 that is 4 octets in length. The frame check sequence field 322 is a cyclic redundancy check (CRC) used to check the integrity of the packet 300. Although the fields of the exemplary packet 300 are shown having a certain length, and in a certain order, a person having ordinary skill in the art will appreciate that the various fields can be different lengths, the fields can be in a different order, additional fields can be included, and a portion of fields (or entire fields) can be omitted.

In an embodiment, the fields 302-318 and 322 are the header of the packet 300. In an embodiment where the optional address 4 field 314 is not included in the packet 300, the length of the header is 34 octets. In certain aspects, each packet 300 of a flow transmitted from the wireless device 202t to the wireless device 202r includes all of the header information of the packet 300. Accordingly, each packet 300 of a flow may include 34 octets of information related to the packet 300. The wireless device 202r may utilize the information of the header to process the packet 300.

In a flow, some of the header information described with respect to the packet 300 used to process a packet of the flow may be the same for all packets of the flow. For example, the data in the address 1 field which indicates the address of the destination device of the packet, the address 2 field which indicates the address of the source device of the packet, the QoS control field 316, and/or the HT field 318 may not change between packets of the flow. This header information that does not change between packets of a flow may be referred to as, for example, "constant header information" or "common header information."

In certain aspects, instead of transmitting the constant header information in each packet of a flow, the constant header information may only be transmitted by the wireless device 202t in a subset of the packets of a flow. For example, the constant header information may be transmitted in only a first packet of the flow. This first packet with the constant header information may be referred to as a "head" frame. The subsequent packets of the flow may be sent without the constant header information. These subsequent packets may include header information (that changes from packet to packet of a flow) and data to be transmitted. The subsequent packets with the header information and the data may be transmitted in response to detecting a successful receipt (e.g., an acknowledgement message) of the head frame The subsequent packets with such data may be referred to as "data" frames. The receiver, wireless device 202r, of the flow may store the constant header information received in the head frame and use the constant header information to process the data frames. Accordingly, the wireless device 202r may use a method of associating the data frames of the flow with the head frame.

In certain aspects, the wireless device 202t assigns a flow identifier to each flow that it transmits to another device. The flow identifier may be a unique identifier of a flow between the wireless device 202t and a wireless device 202r. For example, if the wireless device 202t and the wireless device 202r have multiple flows between each other (in either direction), each flow may be assigned a different flow identifier (e.g., 1, 2, 3, etc.). Each of the wireless device 202t and the wireless device 202r may keep track of the flows between the devices and the associated flow identifiers so as not to assign the same flow identifier to multiple flows. Further, in certain aspects, when a flow is completed, such as when all the data of a flow is transmitted between the wireless device 202t and the wireless device 202r and the flow is terminated, the associated flow identifier of the terminated flow may be used for a new flow.

Termination of a flow between the wireless device 202t and the wireless device 202r may be signaled to the wireless device 202r by the wireless device 202t. For example, the wireless device 202t may indicate within the last data frame of the flow that includes data to send to the wireless device 202r that it is the last data frame and the flow is terminated after receipt of the last data frame. For example, the indication may be a value of a bit in a frame control field of the data frame.

In another aspect, the wireless device 202t may indicate termination of a flow by transmitting a termination frame or "tail" frame to the wireless device 202r that indicates the flow should be terminated. Accordingly, the wireless device 202t may transmit the last data frame without any indication to the wireless device 202r that it is the last data frame. Further, the wireless device 202t may transmit the tail frame after the last data frame to indicate to the wireless device 202r that the flow is terminated.

In some aspects, the head frames, data frames, and tail frames may comprise MAC protocol data units (MPDUs). In certain aspects, multiple MPDUs may be aggregated into an aggregated-MPDU (A-MPDU). In certain aspects, the data frames of a flow may be transmitted as part of the same A-MPDU. Further, in certain aspects, the head frame, data frames, and tail frame of a flow may be transmitted as part of the same A-MPDU.

FIG. 4 illustrates an example of a head frame 400 transmitted as part of a flow between wireless devices 202t and 202r. As shown, the head frame 400 includes several fields that are similar to the fields described above with reference to the packet 300. For example, the head frame 400 includes a FC field 402 similar to FC field 302 described above with reference to the packet 300 (which may indicate that the packet is of the type as shown for head frame 400), followed by a flow identifier (ID) field 404 that is 2 octets in length. Based on a value of the FC field 402, the wireless device 202r may determine the head frame 400 is a head frame. The flow ID field includes a flow identifier of the flow. Further, the head frame 400 includes a destination address field 406 similar to the address 1 field 306 described above with reference to the packet 300, a source address field 408 similar to the address 2 field 308 described above with reference to the packet 300, and a BSS identifier (BSSID) field 410 that is 6 octets in length and includes an ID of the BSS to which the wireless devices 202t and/or 202r belong. The head frame 400 further includes a QoS control field 416 similar to the QoS control field 316 described above with reference to the packet 300, a HT control field 418 similar to the HT control field 318 described above with reference to the packet 300, and a FCS field 422 similar to the FCS field 322 described above with reference to the packet 300. Accordingly, the head frame 400 has a size of 32 octets. It should be noted that the order of the fields, though shown as one example in FIG. 4, may be changed. Further, when constant header information is not needed to process packets of the flow, that information is excluded from the head frame. Further, when additional constant header information (e.g., common header information) is needed to process packets of the flow, that information is included in the head frame.

FIG. 5 illustrates another example of a head frame 500 transmitted as part of a flow between wireless devices 202t and 202r. As shown, the head frame 500 includes the same fields as the head frame 400. However, the head frame 500 further includes a payload field 520 similar to the frame body 320 described above with reference to the packet 300. Accordingly, the head frame 500 may include data to send to the wireless device 202r along with the header information. It should be noted that the order of the fields, though shown as one example in FIG. 5, may be changed.

FIG. 6 illustrates an example of a data frame 600 transmitted as part of a flow between wireless devices 202t and 202r. As shown, the data frame 600 includes the FC field 602 similar to the FC field 302 described above with reference to the packet 300 (which may indicate that the packet is of the type as shown for data frame 600), a flow identifier field 604 similar to the flow ID field 404 described above with reference to the head frame 400, a sequence control field 612 similar to the sequence control field 312 described above with reference to the packet 300, a data payload field 620 similar to the frame body 320 described above with reference to the packet 300, and a FCS field 622 similar to the FCS field 322 described above with reference to the packet 300. In an embodiment, the FCS field 622 can include a Cyclic Redundancy Check (CRC) calculated on one or more of the fields in the data frame 600. In an embodiment, the FCS field 622 can include a CRC calculated on additional fields not included in the data frame 600. For example, the FCS field 622 calculation can further include one or more field in a head frame, which were omitted from the data frame 600. In an embodiment, the FCS field 622 can incorporate the BSSID (or the destination address, for example, when the wireless device 202t transmits over the uplink 110). In another embodiment, the flow ID field 404 can indicate, to the receiver 202r, which BSSID to use for calculation of the FCS field 622 (such as, for example, where the AP 104 includes multiple BSSIDs). Incorporating the BSSID in the FCS field 622 calculation can allow a receiver to determine the correct BSSID, for example in a multiple-BSSID network environment.

Based on a value of the FC field 602, the wireless device 202r may determine the data frame 600 is a data frame. As shown, the overhead for transmitting the data in the data payload field 620 is 10 octets as opposed to the 34 octets required for packet 300. Accordingly, data can be sent in data frames 600 with much less overhead than if sent in packets 300. The wireless device 202r may utilize the flow ID from the flow ID field 604 to find a head frame associated with the data frame 600 that includes header information to process the data frame 600. For example, the wireless device 202r determines a head frame is associated with the data frame 600 if the head frame is received from the same device (wireless device 202t) as the data frame 600 and includes the same flow ID as the data frame 600. Packets in a flow may have a different sequence control field 612 and/or FCS field 622 from packet to packet, and therefore such information may be included in the data frame 600. Further, the FC field 602 may be included in the data frame 600 to indicate to the wireless device 202r the type of packet so the wireless device 202r knows how to interpret the data in the data frame 600. Further, in some aspects one or more bits in the FC field 602 may be used to indicate if the data frame 600 is the last data frame of the flow and the flow identified in the flow ID field 604 is terminated.

In an embodiment, the FC field 602 can include an acknowledgement ("ACK") type indicator. The ACK type indicator can indicate, for example, whether the data frame 600 should be acknowledged via a frame ACK or a Block ACK (BLA). In an embodiment, the ACK type indicator can indicate that the data frame 600 should not be acknowledged. In an embodiment, the ACK type indicator can include one or more bits. In an embodiment, a physical layer ("PHY") preamble can include the ACK type indicator. In another embodiment, a MAC header (for example, one bit in the FC field) can also include the ACK type indicator.

It should be noted that the order of the fields, though shown as one example in FIG. 6, may be changed. Further, when non-constant header information is not needed to process packets of the flow, that information is excluded from the data frame. Further, when additional non-constant header information is needed to process packets of the flow, that information is included in the data frame.

FIG. 7 illustrates an example of a tail frame 700 transmitted as part of a flow between wireless devices 202t and 202r. As shown, the tail frame 700 includes an FC field 702 similar to the FC field 302 described above with reference to the packet 300 (which may indicate that the packet is of the type as shown for tail frame 700), a flow identifier field 704 similar to the flow ID field 404 described above with reference to the head frame 400, and a FCS field 722 similar to the FCS field 322 described above with reference to the packet 300. Based on a value of the FC field 702, the wireless device 202r may determine the tail frame 700 is a tail frame. Accordingly, the wireless device 202r may determine that the flow associated with the flow ID indicated in the flow identifier field 704 is terminated.

Allocating and Utilizing Flow Identifiers

Figure 8:
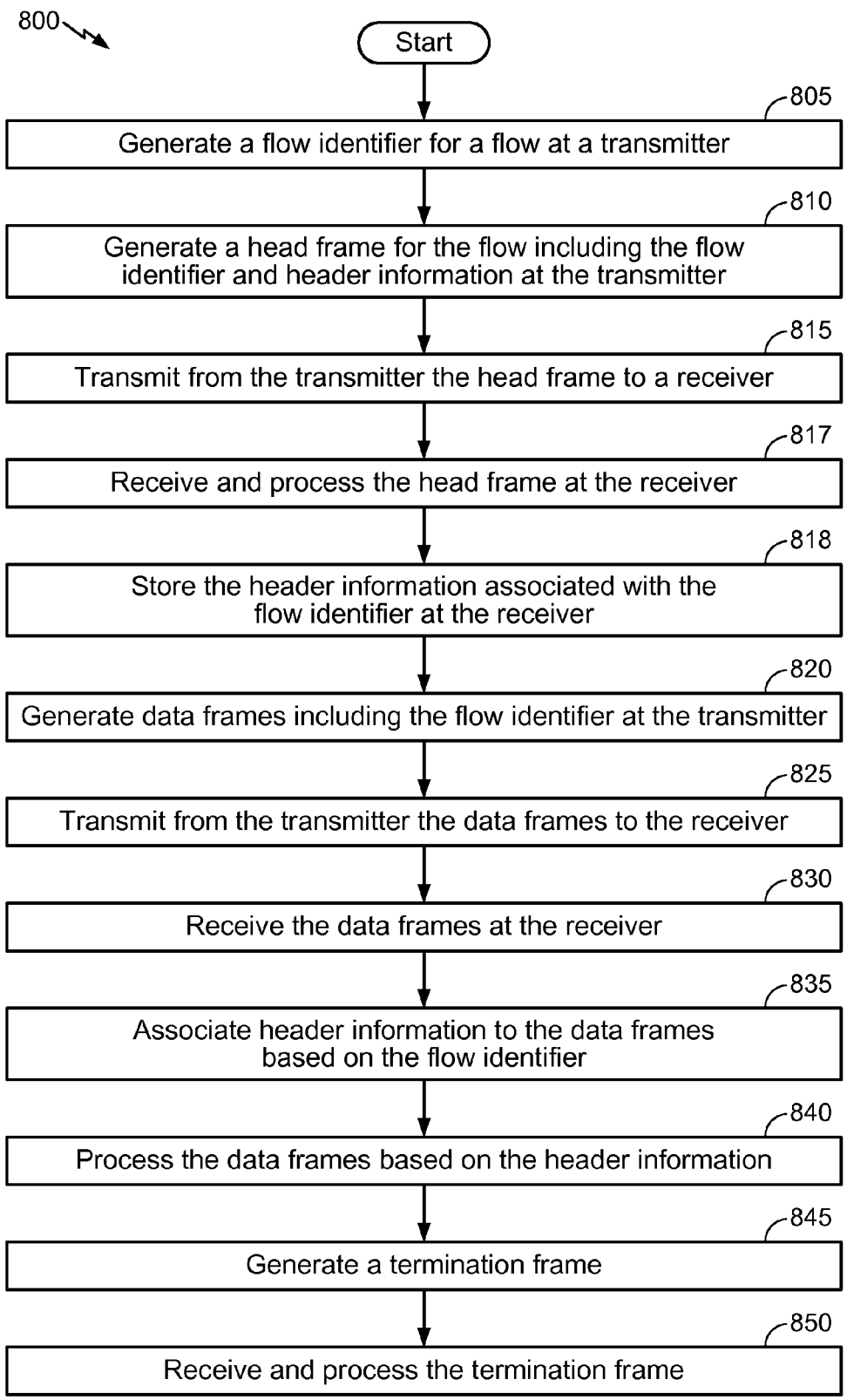
FIG. 8 is a flowchart of a process for transmitting packets of a flow in the wireless communication system of FIG. 1.

FIG. 8 is a flowchart of a process 800 for transmitting packets of a flow in the wireless communication system of FIG. 1. At a block 805, the wireless device 202t generates a flow identifier for a flow that the wireless device 202t will transmit to the wireless device 202r. In various embodiments, the generated flow identifier can be the flow ID 404, 604, 704, 1106, 1208, and/or 1304 (FIGS. 4, 6, 7, 11, and 12). In an embodiment, the wireless device 202t can generate the flow identifier as a globally unique (e.g., unique within any network) identifier or locally unique (e.g., unique within a particular local network) identifier. In an embodiment, the wireless device 202t can generate the flow identifier based on a portion of information about the sending device, the receiving device, and/or or the network.

Referring still to block 805 of FIG. 8, in an embodiment, the wireless device 202t can generate the flow identifier based on the BSSID. In an embodiment, the flow identifier can be a portion of the BSSID (a "partial BSSID") combined with a local flow ID. In an embodiment, the partial BSSID can be the least significant byte of the BSSID. In another embodiment, the partial BSSID can be a hash of the BSSID. In various embodiments, the wireless device 202t can generate the flow identifier as described above, using the destination address in place of the BSSID (for example, when the wireless device 202t transmits over the uplink 110). In an embodiment, the local flow ID can be a random or pseudorandom number. In another embodiment, the local flow ID can be the Association ID (AID) of the receiver 202r.

In embodiments where the wireless device 202r as a receiver assigns the flow ID, for example in the uplink 110, the wireless device 202t may not have access to the list of assigned or active flow IDs. Therefore, the wireless device 202t can transmit a request message to the wireless device 202r. In one embodiment, the request message can include a temporary flow ID, which can be a predetermined value such as, for example, zero. The predetermined value can indicate a request for the wireless device 202r to assign a valid flow ID. In another embodiment, the temporary flow ID can be a random or pseudorandom value. In another embodiment, the temporary flow ID can be generated in the same way as described above with respect to non-temporary flow IDs.

Further, at a block 810, the wireless device 202t generates a head frame with the flow identifier and constant header information for packets of the flow. In various embodiments, the head frame can be the head frame 400 and/or 1000 described herein with respect to FIGS. 4 and 10. Continuing, at a block 815, the wireless device 202t transmits the head frame to the wireless device 202r. At a block 817, the wireless device 202r receives the head frame and processes the head frame based on the header information in the head frame. In embodiments where the head frame contains a temporary flow ID, such as embodiments where the wireless device 202r receives the head frame via the uplink 110 (for example), the wireless device 202r can check to see if the temporary flow ID is available or otherwise valid. In embodiments where the temporary flow ID is a reserved ID indicating that the wireless device 202t is requesting a valid flow ID (such as, for example, a flow ID of zero), the wireless device 202r may generate a valid flow ID as described above. The wireless device 202r may send the valid flow ID to the wireless device 202t via an acknowledgement/response frame or other communication.

In embodiments where the temporary flow ID is a random or pseudorandom flow ID that is unassigned or otherwise valid, the wireless device 202r may indicate acceptance of the temporary flow ID to the wireless device 202t via an acknowledgement/response or other communication. In an embodiment, the acknowledgement can include one bit in the PHY or FC. In embodiments where the temporary flow ID is a random or pseudorandom flow ID that is assigned or otherwise not valid, the wireless device 202r may reject the temporary flow ID via a negative acknowledgement or other communication. In an embodiment, when the wireless device 202r rejects an invalid temporary flow ID, the wireless device 202r may respond to the wireless device 202t with a valid flow ID assignment. Further, at a block 818, the wireless device 202r stores the constant header information received in the head frame and associates the constant header information with the flow identifier received in the head frame or the valid flow ID assignment.

At a block 820, the wireless device 202t generates data frames with data, non-constant header information, and the flow identifier to send to the wireless device 202r. At a block 825, the wireless device 202t transmits the data frames to the wireless device 202r. Continuing, at a block 830, the wireless device 202r receives the data frames. Further, at a block 835, the wireless device 202r associates or matches the constant header information to the data frames, based on the flow identifier of the head frame in which the constant header information was received, and to the data frames. At a block 840, the wireless device 202r processes the data frames based on the constant header information matched. For example, the wireless device 202r maps the flow identifier in the data frames to the constant header information received in the head frame. Further, the wireless device 202r decodes the data frames based on the constant header information.

At a block 845, the wireless device 202t generates a last data frame with an indication to terminate the flow, or a tail frame and transmits the last data frame to the wireless device 202r. Further, at a block 850, the wireless device 202r receives the last data frame or the tail frame, processes the frame based on the type of frame, and terminates the flow.

Figure 9:
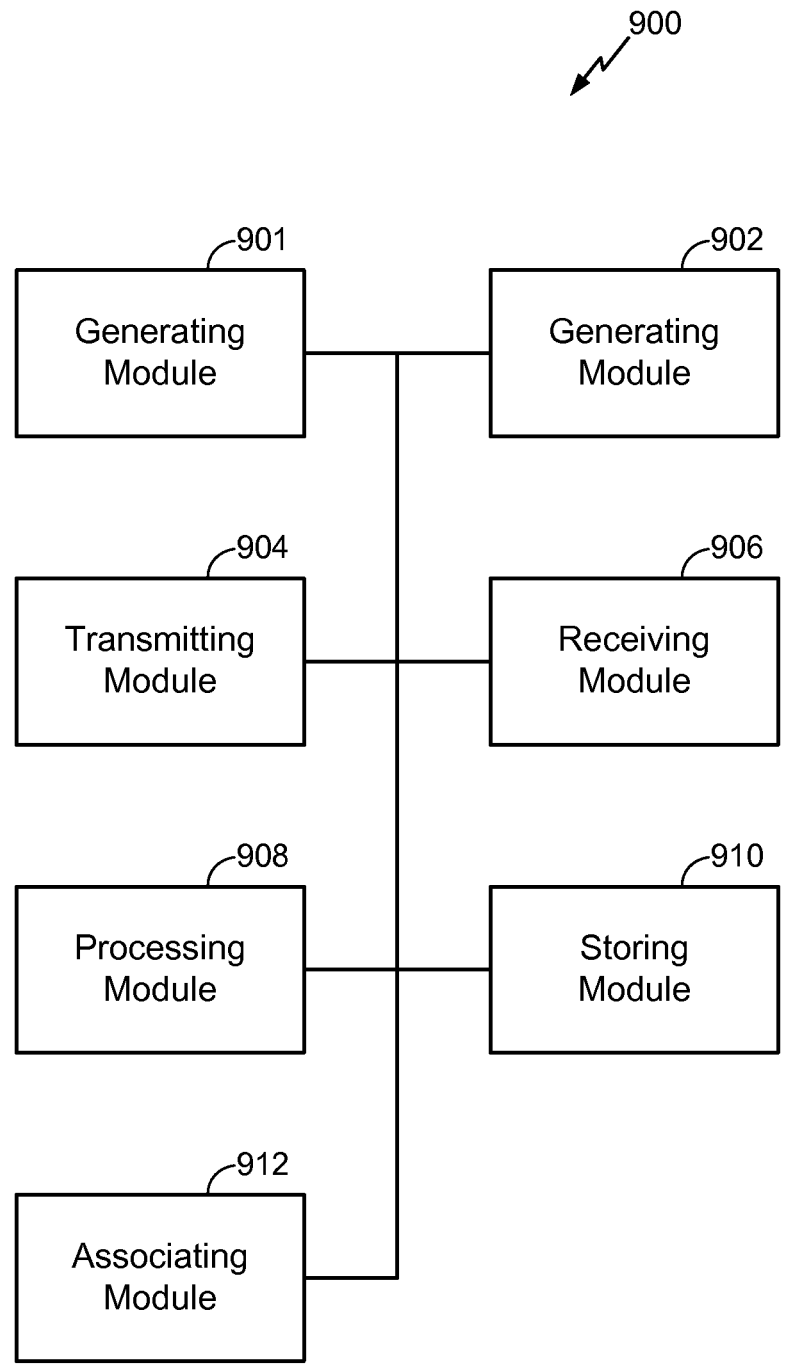
FIG. 9 is another functional block diagram of an exemplary wireless device that may be employed within the wireless communication system of FIG. 1.

FIG. 9 is another functional block diagram of an exemplary wireless device 900 that may be employed within the wireless communication system 100. The device 900 includes a generating module 901 for generating a flow identifier for a flow. The generating module 901 may be configured to perform one or more of the functions described above with respect to the block 805 illustrated in FIG. 8. The generating module 901 may correspond to the processor 204 and/or the DSP 220.

The device 900 further comprises a generating module 902 for generating packets or frames. The generating module 902 may be configured to perform one or more of the functions described above with respect to the blocks 810, 820, and/or 845 illustrated in FIG. 8. The generating module 902 may correspond to the processor 204 and/or the DSP 220.

The device 900 further comprises a transmitting module 904 for transmitting packets or frames to another wireless device. The transmitting module 904 may be configured to perform one or more of the functions described above with respect to the blocks 815, 825, and/or 845 illustrated in FIG. 8. The transmitting module 904 may correspond to the transmitter 210.

The device 900 further comprises a receiving module 906 for receiving packets or frames from another wireless device. The receiving module 906 may be configured to perform one or more of the functions described above with respect to the blocks 817, 830, and/or 850 illustrated in FIG. 8. The receiving module 906 may correspond to the receiver 212.

The device 900 further comprises a processing module 908 for processing packets or frames. The processing module 908 may be configured to perform one or more of the functions described above with respect to the blocks 817, 840, and/or 850 illustrated in FIG. 8. The processing module 908 may correspond to the processor 204 and/or the DSP 220.

The device 900 further comprises a storing module 910 for storing constant header information. The storing module 910 may be configured to perform one or more of the functions described above with respect to the block 818 illustrated in FIG. 8. The storing module 910 may correspond to the processor 204, the DSP 220, and/or the memory 206.

The device 900 further comprises an associating module 912 for associating packets or frames to constant header information based on flow identifiers. The associating module 912 may be configured to perform one or more of the functions described above with respect to the blocks 835 and/or 850 illustrated in FIG. 8. The associating module 912 may correspond to the processor 204 and/or the DSP 220.

Head/Tail in Management Action Frames

In various embodiments, the head and tail frames described heretofore can be implemented using the same basic frame type as the data frames. For example, each of the head, tail, and data frames may be implemented using the 802.11 data frames. In another embodiment, the head and tail frames may be implemented using a separate basic frame type such as, for example, 802.11 management action frames. In some embodiments where the head and tail frames are implemented using management action frames, the head and tail frames may include a unified frame format having substantially the same fields. In some implementations, management action frames may be given a higher priority than other frame types. Accordingly, head frames transmitted over management action frames may allow flows to be established faster than head frames transmitted over other frame types.

Figure 10:
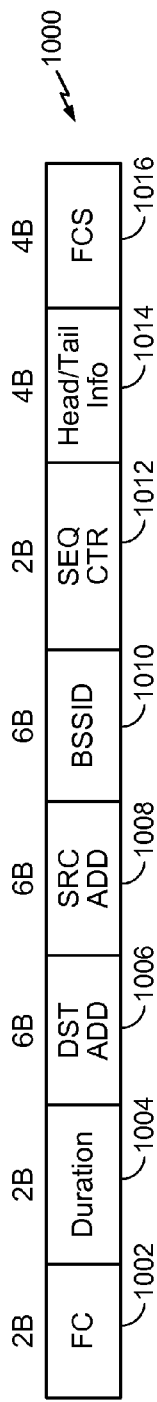
FIG. 10 illustrates an example of a management action frame transmitted as part of a flow between wireless devices of the wireless communication system of FIG. 1.

FIG. 10 illustrates an example of a management action frame 1000 transmitted as part of a flow between wireless devices of the wireless communication system of FIG. 1. As shown, the management action frame 1000 includes a MAC frame that has a MAC frame format. The management action frame 1000 includes a frame control (FC) field 1002 that is 2 octets (e.g., bytes) in length. The FC field 1002 may indicate the type of the management action frame 1000. For example, the FC field 1002 may indicate that the management action frame 1000 is a management frame type ("00") having an action frame subtype ("1101").

The FC field 1002 is followed by a duration or identifier (ID) field 1004 that is 2 octets in length. The duration field 1004 may indicate the length of the management action frame 1000. The duration field 1004 is followed by an destination address field 1006 that is 6 octets in length. The destination address field 1006 may indicate the address of the destination device (e.g., wireless device 202r) of the management action frame 1000. The destination address field 1006 is followed by a source address field 1008 that is 6 octets in length. The source address field 1008 may indicate the address of the source device (e.g., wireless device 202t) of the management action frame 1000.

The source address field 1008 is followed by a BSSID field 1010 that is 6 octets in length. The BSSID field 1010 indicates the BSSID that the wireless device 202 is associated with. The BSSID field 1010 is followed by a sequence control field 1012 that is 2 octets in length. The sequence control field 1012 may indicate the order or sequence number of the management action frame 1000 within a flow.

The sequence control field 1012 is followed by a head/tail information field 1014. In an embodiment, the head/tail information field 1014 may include one or more fields of the head frame 400 (FIG. 4), the head frame 500 (FIG. 5), and the fail frame 700 (FIG. 7). For example, the head/tail information field 1014 may include at least a flow ID. In an embodiment, the head/tail information field 1014 may include one or more of: the flow ID, a category field, an action field, the QoS control field, and the HT control field.

The head/tail information field 1014 is followed by a frame check sequence (FCS) field 1016 that is 4 octets in length. The frame check sequence field 1016 is a cyclic redundancy check (CRC) used to check the integrity of the management action frame 1000. In an embodiment, the frame check sequence field 1016 can be a CRC computed over one or more of the fields in the management action frame. Although the fields of the exemplary management action frame 1000 are shown having a certain length, and in a certain order, a person having ordinary skill in the art will appreciate that the various fields can be different lengths, the fields can be in a different order, additional fields can be included, and a portion of fields, or entire fields, can be omitted.

Figure 11:
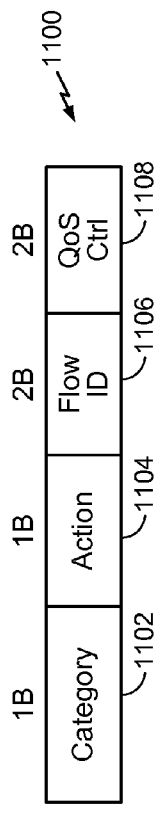
FIG. 11 illustrates an example of a head/tail information field of the management action frame of FIG. 10.

FIG. 11 illustrates an example of a head/tail information field 1100 of the management action frame 1000 of FIG. 10. As shown, the head/tail information field 1100 includes a category field 1102 that is 1 octet in length. In an embodiment, the category field 1102 can indicate the type of the management action frame 1000. For example, the category field 1102 may indicate that the management action frame 1000 is a management frame type ("00") having an action frame subtype ("1101"). In various embodiments, reserved values 9-126 of the category field 1102 can be used.

The category field 1102 is followed by an action field 1104. In an embodiment, the action field 1104 can indicate whether the management action frame 1000 is a head frame or a tail frame. In other words, the action field 1104 can be used to indicate whether the wireless device 202*t* is initiating or terminating a flow. In various embodiments, reserved values 4-255 of the action field 1104 can be used.

The action field 1104 is followed by a flow ID field 1106 that is 2 octets in length. The flow ID field includes a flow identifier as described above. The flow ID field 1106 is followed by a quality of service (QoS) control field 1108 that is 2 octets in length. The QoS control field 1108 may be used to indicate a QoS level or parameter of the packet 1000. Although the fields of the exemplary head/tail information field 1100 are shown having a certain length, and in a certain order, a person having ordinary skill in the art will appreciate that the various fields can be different lengths, the fields can be in a different order, additional fields can be included, and a portion of fields, or entire fields, can be omitted.

Encrypted Flows

In various embodiments, the systems and methods described above can be implemented in the context of encrypted communication systems. For example, flows can be encrypted using Counter-Mode/CBC-Mac Protocol (CCMP). In an embodiment, the head and tail frames described above with respect to FIGS. 10 and 11 can be used to initiate and terminate encrypted flows with the addition of CCMP header information.

Figure 12:
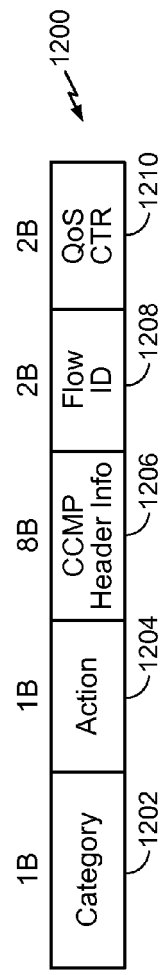
FIG. 12 illustrates another example of a head/tail information field with security information of the management action frame of FIG. 10.

FIG. 12 illustrates another example of a head/tail information field 1200 of the management action frame 1000 of FIG. 10. The head/tail information field 1200 includes CCMP header information and can be used in conjunction with flows including data encrypted via CCMP. As shown, the head/tail information field 1200 includes a category field 1202 that is 1 octet in length. In an embodiment, the category field 1202 can indicate the type of the management action frame 1000. For example, the category field 1202 may indicate that the management action frame 1000 is a management frame type ("00") having an action frame subtype ("1101"). In various embodiments, reserved values 9-126 of the category field 1202 can be used.

The category field 1202 is followed by an action field 1204. In an embodiment, the action field 1204 can indicate whether the management action frame 1000 is a head frame or a tail frame. In other words, the action field 1204 can be used to indicate whether the wireless device 202*t* is initiating or terminating a flow. In various embodiments, reserved values 4-255 of the action field 1204 can be used.

The action field 1204 is followed by a CCMP header information field 1206 that is 8 octets in length. The CCMP header information field 1206 can include CCMP header information sufficient to initiate or maintain a flow encrypted via CCMP. The CCMP header information field 1206 is followed by a flow ID field 1208 that is 2 octets in length. The flow ID field includes a flow identifier as described above. The flow ID field 1208 is followed by a quality of service (QoS) control field 1210 that is 2 octets in length. The QoS control field 1210 may be used to indicate a QoS level or parameter of the management action frame 1000. Although the fields of the exemplary head/tail information field 1200 are shown having a certain length, and in a certain order, a person having ordinary skill in the art will appreciate that the various fields can be different lengths, the fields can be in a different order, additional fields can be included, and entire fields can be omitted.

In embodiments implementing encrypted data flows, data frames can be used similar to the data frame 600 described above with respect to FIG. 6. In an embodiment, the data payload 620 and FSC 622 can be replaced with an encrypted data payload and Message Integrity Check (MIC).

Figure 13:
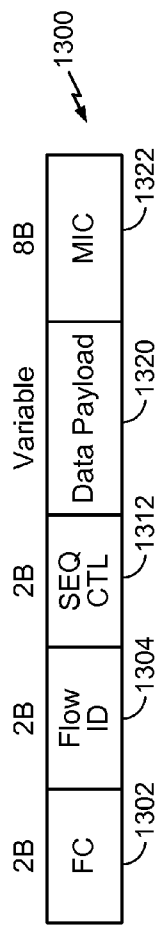
FIG. 13 illustrates another example of a data frame with security information transmitted as part of a flow between wireless devices of the wireless communication system of FIG. 1.

FIG. 13 illustrates another example of a data frame 1300 transmitted as part of a flow between wireless devices of the wireless communication system of FIG. 1. FIG. 13 illustrates an example of a data frame 1300 transmitted as part of an encrypted flow between wireless devices 202*t* and 202*r*. As shown, the data frame 1300 includes the FC field 1302 similar to the FC field 302 described above with reference to the packet 300 (which may indicate that the packet is of the type as shown for data frame 1300), a flow identifier field 1304 similar to the flow ID field 404 described above with reference to the head frame 400, a sequence control field 1312 similar to the sequence control field 312 described above with reference to the packet 300, an encrypted data payload field 1320 similar to the frame body 320 described above with reference to the packet 300, and a MIC field 1322.

As shown, the data payload field 1320 and the MIC field 1322 constitute an encrypted portion of the data frame 1300. In an aspect, the MIC 1322 may be generated by encrypting one or more pieces of identifying information with a shared secret key. The identifying information can include a sequence counter and a direction indicator, and can be padded to a predetermined length. The MIC field 1322 can be similar in function to the FCS field 322 described above with reference to the packet 300.

Based on a value of the FC field 1302, the wireless device 202*r* may determine the data frame 1300 is a data frame. As shown, the overhead for transmitting the data in the data payload field 1320 is 10 octets as opposed to the 34 octets required for packet 300. Accordingly, data can be sent in data frames 1300 with much less overhead than if sent in packets 300. The wireless device 202*r* may utilize the flow ID from the flow ID field 1304 to find a head frame associated with the data frame 1300 that includes header information to process the data frame 1300. For example, the wireless device 202*r* determine a head frame is associated if it is received from the same device (wireless device 202*t*) as the data frame 1300 and includes the same flow ID as the data frame 1300. Packets in a flow may have a different sequence control field 1312 and/or MIC field 1322 from packet to packet, and therefore such information may be included in the data frame 1300. Further, the FC field 1302 may be included in the data frame 1300 to indicate to the wireless device 202*r* the type of packet so the wireless device 202*r* knows how to interpret the data in the data frame 1300. Further, in some aspects one or more bits in the FC field 1302 may be used to indicate if the data frame 1300 is the last data frame of the flow and the flow identified in the flow ID field 1304 is terminated.

In a particular embodiment, a wireless communications device includes means for assigning a flow identifier to a flow that includes a plurality of packets. For example, the means for assigning may include one or more components (e.g., a processor) of the AP 104 of FIG. 1, one or more components (e.g., a processor) of the STAs 106 of FIG. 1, the processor 204 or the DSP 220 of FIG. 2, the generating module 901 of FIG. 9, one or more other devices configured to assign a flow ID, or a combination thereof. The wireless communications device also includes means for generating data packets. The means for generating is configured to generate a head packet of a plurality of packets, the head packet including one or more header information fields. The means for generating is also configured to generate at least one data packet of the plurality of packets, where the at least one data packet includes packet specific information and the flow identifier instead of the one or more header information fields. For example, the means for generating may include one or more components (e.g., a processor) of the AP 104 of FIG. 1, one or more components (e.g., a processor) of the STAs 106 of FIG. 1, the processor 204 or the DSP 220 of FIG. 2, the generating module 902 of FIG. 9, one or more other devices configured to generate packets, or a combination thereof.

The wireless communications device further includes means for transmitting. The means for transmitting is configured to transmit the head packet. The means for transmitting is also configured to, in response to detecting a successful receipt of the head packet, transmit the at least one data packet. The means for transmitting may include one or more components (e.g., a transmitter) of the AP 104 of FIG. 1, one or more components (e.g., a transmitter) of the STAs 106 of FIG. 1, the transmitter 210 of FIG. 2, the transmitting module 904 of FIG. 9, one or more other devices configured to transmit data, or a combination thereof.

In another particular embodiment, a wireless communications device includes means for receiving a flow that includes a plurality of packets having a head packet and at least one data packet, where the head packet includes a flow identifier of the flow and one or more header information fields that are associated with the flow identifier, and where the at least one data packet includes packet specific information and the flow identifier instead of the one or more header information fields. For example, the means for receiving may include one or more components (e.g., a receiver) of the AP 104 of FIG. 1, one or more components (e.g., a receiver) of the STAs 106 of FIG. 1, the receiver 212 of FIG. 2, the receiving module 906 of FIG. 9, one or more other devices configured to receive data, or a combination thereof. The wireless communications device also includes means for processing the at least one data packet based on one or more header information fields. For example, the means for processing may include one or more components (e.g., a processor) of the AP 104 of FIG. 1, one or more components (e.g., a processor) of the STAs 106 of FIG. 1, the processor 204 or the DSP 220 of FIG. 2, the processing module 908 of FIG. 9, one or more other devices configured to process packets, or a combination thereof.

One or more of the disclosed embodiments may be implemented in a system or an apparatus that may include a communications device, a fixed location data unit, a mobile location data unit, a mobile phone, a cellular phone, a computer, a tablet, a portable computer, or a desktop computer. Additionally, the system or the apparatus may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-13 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above may be performed by any suitable means capable of performing the operations, such as various hardware and/or software component(s), circuits, and/or module(s). Generally, any operations illustrated in FIGS. 1-13 may be performed by corresponding functional means capable of performing the operations. Skilled artisans may implement the described functionality in varying ways for each particular application, but such implementation decisions should not be interpreted as causing a departure from the scope of the present disclosure.

Those of skilled in the art would further appreciate that the various illustrative logical blocks, configurations, modules, circuits, and algorithm steps described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes computer-readable storage media and communication media including any medium that facilitates transfer of a computer program from one place to another. A storage media may be any available media that can be accessed by a computer. By way of example, and not limitation, such computer-readable storage media can include random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage or other magnetic storage devices, or any other medium that can be used to store desired program code in the form of instructions or data structures and that can be accessed by a computer. In the alternative, the computer-readable storage media may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), and hard disk disc where disks usually reproduce data magnetically, while discs reproduce data optically with lasers. Thus, in some aspects computer readable medium may include a non-transitory computer readable medium (e.g., tangible media). In addition, in some aspects computer readable medium may include a transitory computer readable medium (e.g., a signal). Combinations of the above should also be included within the scope of computer-readable media.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may include a computer-readable storage medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, a physical storage medium such as a compact disc (CD) or floppy disk, etc. Moreover, any other suitable technique for providing the methods and techniques described herein to a device can be utilized.

It is to be understood that the claims are not limited to the precise configuration and components illustrated above. The previous description of the disclosed embodiments is provided to enable a person skilled in the art to make or use the disclosed embodiments. While the foregoing is directed to aspects of the present disclosure, other and further aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A wireless communications device comprising:
a processor to perform operations including:
assigning a flow identifier to a flow that includes a plurality of packets, wherein the flow identifier includes a portion of a basic service set identification (BSSID) and a local flow identifier, the portion of the BSSID including a least significant byte of the BSSID;
generating a head packet of the plurality of packets, the head packet including one or more header information fields that are associated with the flow identifier;
detecting an indication of receipt of the head packet by a device after transmission of the head packet to the device; and
generating at least one data packet of the plurality of packets, wherein the at least one data packet includes packet specific information and the flow identifier instead of the one or more header information fields; and a transmitter coupled to the processor, the transmitter to transmit the head packet to the device and the transmitter to transmit the at least one data packet to the device in response to detection by the processor of the indication of receipt of the head packet by the device.

2. The wireless communications device of claim 1, wherein the one or more header information fields are common header information fields that include a field corresponding to a source address, a field corresponding to a destination address, a field corresponding to a quality of service (QoS) level, a field corresponding to a transmission throughput mode, or a combination thereof.

3. The wireless communications device of claim 1, wherein the flow identifier is unique to the flow.

4. The wireless communications device of claim 1, wherein the portion of the BSSID is all of the BSSID.

5. The wireless communications device of claim 1, wherein the portion of the BSSID is used for cyclic redundancy check (CRC) calculation.

6. The wireless communications device of claim 5, wherein the local flow identifier comprises a random number or a pseudorandom number.

7. The wireless communications device of claim 1, wherein the local flow identifier comprises an association identifier.

8. The wireless communications device of claim 7, wherein the association identifier includes a receiver association identifier.

9. The wireless communications device of claim 1, wherein the flow identifier comprises a hash of the portion of the BSSID.

10. The wireless communications device of claim 1, wherein the one or more header information fields include a frame control field and wherein a particular value of a particular bit of the frame control field provides an indication that a particular data packet of the at least one data packet is a last data packet.

11. The wireless communications device of claim 1, wherein the operations further include generating a tail packet indicating the flow is terminated and wherein the transmitter transmits the tail packet.

12. The wireless communications device of claim 1, wherein the head packet further comprises at least a portion of a data payload.

13. The wireless communications device of claim 1, wherein the head packet and the at least one data packet are included in a single aggregated media access control protocol data unit.

14. The wireless communications device of claim 1, wherein the head packet comprises a management action frame and the at least one data packet comprises a data frame, wherein the management action frame has a higher priority than other frame types.

15. The wireless communications device of claim 1, wherein the at least one data packet comprises an acknowledgement type indicator.

16. The wireless communications device of claim 15, wherein the acknowledgement type indicator comprises an indication that the at least one data packet is to be acknowledged by a frame acknowledgement, an indication that the at least one data packet is to be acknowledged by a block acknowledgement, or an indication that the at least one data packet is not to be acknowledged.

17. The wireless communications device of claim 16, wherein the at least one data packet comprises a physical layer (PHY) preamble including the acknowledgement type indicator.

18. The wireless communications device of claim 16, wherein the at least one data packet comprises a frame control (FC) field including the acknowledgement type indicator.

19. The wireless communications device of claim 1, wherein the operations further include encrypting at least a portion of the at least one data packet.

20. The wireless communications device of claim 19, wherein the head packet comprises a security header.

21. The wireless communications device of claim 20, wherein the at least one data packet comprises a message integrity check.

22. The wireless communications device of claim 1, wherein the operations further include requesting assignment of the flow identifier.

23. The wireless communications device of claim 1, wherein the operations further include assigning the flow identifier in response to a flow identifier assignment request.

24. The wireless communications device of claim 1, further comprising a receiver configured to receive a particular flow identifier in response to the transmitter transmitting a flow identifier assignment request, wherein the operations further include assigning the flow identifier based on the particular flow identifier.

25. The wireless communications device of claim 24, wherein the head packet includes the flow identifier assignment request.

26. The wireless communications device of claim 25, wherein the flow identifier assignment request corresponds to the flow identifier having a value of zero.

27. The wireless communications device of claim 1, wherein the operations further include assigning a temporary flow identifier, wherein the head packet includes the temporary flow identifier.

28. The wireless communications device of claim 27, further comprising a receiver configured to receive a flow identifier response message having an indication of whether the temporary flow identifier is accepted, wherein the operations further include:
assigning the flow identifier based on the temporary flow identifier when the temporary flow identifier is accepted; and
assigning the flow identifier based on a replacement flow identifier that is included in the flow identifier response message when the temporary flow identifier is not accepted.

29. The wireless communication device of claim 28, wherein the flow identifier response message includes a bit indicating acceptance of the temporary flow identifier, wherein the bit is included in a frame control (FC) field or a physical layer (PHY) preamble of the flow identifier response message.

30. The wireless communication device of claim 1, wherein the at least one data packet includes one or more fields, the one or more fields including a frame check sequence, wherein the head packet includes one or more additional fields that are not included in the at least one data packet, and wherein the frame check sequence includes a cyclic redundancy check (CRC) calculated based on the one or more fields in the at least one data packet and the one or more additional fields.

31. The wireless communication device of claim 1, further comprising a receiver, wherein the processor detects the indication of receipt of the head packet by the device based on the processor receiving an acknowledgement message for the head packet from the device via the receiver.

32. A method comprising:
assigning, by a wireless communications device operating in a wireless network, a flow identifier to a flow that includes a plurality of packets, wherein the flow identifier includes a portion of a basic service set identification (BSSID) and a local flow identifier, the portion including a least significant byte of the BSSID;
generating a head packet of the plurality of packets, the head packet including one or more header information fields that are associated with the flow identifier;
generating at least one data packet of the plurality of packets, wherein the at least one data packet includes packet specific information and the flow identifier instead of the one or more header information fields;
transmitting the head packet to a second wireless communication device operating in the wireless network; and
in response to detecting an indication of receipt of the head packet by the second wireless communication device, transmitting the at least one data packet to the second wireless communication device.

33. A wireless communications device comprising:
means for assigning a flow identifier to a flow that includes a plurality of packets,
wherein the flow identifier includes a portion of a basic service set identification (BSSID) and a local flow identifier, the portion of the BSSID including a least significant byte of the BSSID;
means for generating data packets, the means for generating configured to:
generate a head packet of the plurality of packets, the head packet including one or more header information fields that are associated with the flow identifier; and
generate at least one data packet of the plurality of packets, wherein the at least one data packet includes packet specific information and the flow identifier instead of the one or more header information fields; and
means for transmitting, the means for transmitting configured to:
transmit the head packet to a device; and
in response to detecting an indication of receipt of the head packet by the device, transmit the at least one data packet to the device.

34. A non-transitory computer-readable medium comprising instructions that when executed cause an apparatus to:
assign a flow identifier to a flow that includes a plurality of packets, wherein the flow identifier includes a portion of a basic service set identification (BSSID) and a local flow identifier, the portion of the BSSID including a least significant byte of the BSSID;
generate a head packet of the plurality of packets, the head packet including one or more header information fields that are associated with the flow identifier;
generate at least one data packet of the plurality of packets, wherein the at least one data packet includes packet specific information and the flow identifier instead of the one or more header information fields;
transmit the head packet to a device; and
in response to detecting an indication of receipt of the head packet by the device, transmit the at least one data packet to the device.

35. A wireless communications device comprising:
a receiver to receive a flow while the wireless communications device is operating in a wireless network, wherein the flow includes a plurality of packets having a head packet and at least one data packet, wherein the head packet includes a flow identifier of the flow and one or more header information fields that are associated with the flow identifier, wherein the flow identifier includes a portion of a basic service set identification (BSSID) and a local flow identifier, the portion of the BSSID including a least significant byte of the BSSID, and wherein the at least one data packet includes packet specific information and the flow identifier instead of the one or more header information fields; and
a processor to perform operations including:
receiving the head packet;
sending an acknowledgment message in response to receipt of the head packet;
receiving the at least one data packet in response to sending the acknowledgment message; and
processing the at least one data packet based on the one or more header information fields.

36. The wireless communications device of claim 35, wherein the portion of the BSSID is used for cyclic redundancy check (CRC) calculation.

37. The wireless communications device of claim 35, wherein the portion of the BSSID is all of the BSSID.

38. The wireless communications device of claim 35, wherein the receiver is further configured to receive a tail packet indicating the flow is terminated.

39. The wireless communications device of claim 38, wherein the head and tail packets comprise management action frames and the at least one data packet comprises a data frame.

40. The wireless communications device of claim 35, wherein the processor is further configured to decrypt at least a portion of the at least one data packet.

41. The wireless communications device of claim 40, wherein the head packet includes a frame control field having a privacy bit, wherein the privacy bit indicates that payloads associated with the head packet and the at least one data packet are encrypted.

42. The wireless communications device of claim 40, wherein:
the head packet includes an initial pseudorandom number;
one or more of the head packet and the at least one data packet include a sequence control field; and
the initial pseudorandom number and the sequence control field are used as a pseudorandom number in decrypting an encrypted payload of the at least one data packet.

43. The wireless communications device of claim 35, wherein the flow identifier corresponds to a flow identifier assignment request, and wherein the processor is further configured to generate a particular flow identifier in response to the flow identifier assignment request.

44. The wireless communications device of claim 35, wherein the receiver is further configured to receive a temporary flow identifier, and wherein the processor is further configured to determine whether the temporary flow identifier is valid and to generate an acknowledgement when the temporary flow identifier is valid.

45. The wireless communications device of claim 35, wherein the head packet comprises a quality of service control field.

46. The wireless communication device of claim 35, wherein the receiver is configured to receive a flow identifier assignment request, wherein the processor is configured to generate a flow identifier response message including a particular flow identifier, and further comprising a transmitter to transmit the flow identifier response message.

47. The wireless communications device of claim 46, wherein the flow identifier assignment request includes a request frame, wherein the flow identifier response message includes a response frame, wherein the request frame is configured to request the particular flow identifier, and wherein the response frame is configured to supply the particular flow identifier.

48. The wireless communications device of claim 35, further comprising a transmitter, wherein the receiver is further configured to receive a flow identifier assignment request including a temporary flow identifier, wherein the processor is further configured to:
   determine whether the temporary flow identifier is valid,
   add the temporary flow identifier to a list of flow identifiers when the temporary flow identifier is valid, and
   generate a flow identifier response message including an indication of whether the temporary flow identifier is valid, wherein the transmitter is configured to transmit the flow identifier response message.

49. The wireless communications device of claim 48, wherein the flow identifier response message includes a bit that indicates acceptance of the temporary flow identifier, and wherein the bit is included in a frame control (FC) field or a physical layer (PHY) preamble of the flow identifier response message.

50. The wireless communications device of claim 48, wherein the processor is further configured to generate a replacement flow identifier when the temporary flow identifier is not valid, wherein the replacement flow identifier is included in the flow identifier response message.

51. A method comprising:
   receiving a head packet of a flow at a first wireless communication device from a second wireless communication device, wherein the first wireless communication device and the second wireless communication device operate in a wireless network, wherein the head packet includes a flow identifier of the flow and one or more header information fields associated with the flow identifier, and wherein the flow identifier includes a portion of a basic service set identification (BSSID) and a local flow identifier, the portion of the BSSID including a least significant byte of the BSSID;
   sending an acknowledgment message to the second wireless communication device in response to receipt of the head packet;
   receiving at least one data packet in response to sending the acknowledgment message, wherein the at least one data packet includes packet specific information and the flow identifier instead of the one or more header information fields; and
   processing the at least one data packet based on the one or more header information fields.

52. A wireless communications device comprising:
   means for receiving a flow, wherein the flow includes a plurality of packets having a head packet and at least one data packet, wherein the head packet includes a flow identifier of the flow and one or more common header information fields that are associated with the flow identifier, wherein the flow identifier includes a portion of a basic service set identification (BSSID) and a local flow identifier, the portion of the BSSID including a least significant byte of the BSSID, and wherein the at least one data packet includes packet specific information and the flow identifier instead of the one or more header information fields;
   means for transmitting an acknowledgment of receipt of the head packet, wherein the means for receiving receives the at least one data packet after transmission of the acknowledgment; and
   means for processing the at least one data packet based on the one or more header information fields.

53. A non-transitory computer-readable medium comprising instructions that when executed by a processor cause an apparatus to:
   receive a head packet of a flow, wherein the head packet includes a flow identifier of the flow and one or more header information fields that are associated with the flow identifier, and wherein the flow identifier includes a portion of a basic service set identification (BSSID) and a local flow identifier, the portion of the BSSID including a least significant byte of the BSSID;
   send an acknowledgment message in response to receipt of the head packet;
   receive at least one data packet in response to sending the acknowledgment message, wherein the at least one data packet includes packet specific information and the flow identifier instead of the one or more header information fields; and
   process the at least one data packet based on the one or more header information fields.

54. A method comprising:
   generating a head packet, the head packet including one or more header information fields and a flow identifier, wherein the flow identifier includes a portion of a basic service set identification (BSSID) and a local flow identifier, the portion of the BSSID including a least significant byte of the BSSID;
   generating, at a wireless communications device operating in a wireless network, a data packet that includes the flow identifier and an acknowledgement type indicator, wherein the acknowledgement type indicator is included in a physical layer preamble of the packet or in a frame control field of the packet, and wherein the acknowledgement type indicator includes an indication that the packet is to be acknowledged by a frame acknowledgement, an indication that the packet is to be acknowledged by a block acknowledgement, or an indication that the packet is not to be acknowledged;
   transmitting the head packet to a device; and
   in response to detecting an indication of receipt of the head packet by the device based on a received acknowledgment, transmitting the data packet to the device.

55. The method of claim 54, wherein the acknowledgement type indicator includes one or more bits.

* * * * *